US009862430B1

(12) United States Patent
Stojkovic et al.

(10) Patent No.: US 9,862,430 B1
(45) Date of Patent: Jan. 9, 2018

(54) TAILGATE COVER

(71) Applicant: Ford Global Technologies, LLC, Dearborn, MI (US)

(72) Inventors: Dragan B. Stojkovic, Taylor, MI (US); Jack Marchlewski, Saline, MI (US); Joshua R. Hemphill, White Lake, MI (US); Robert Reiners, Grosse Ile, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/248,504

(22) Filed: Aug. 26, 2016

(51) Int. Cl.
*B62D 33/03* (2006.01)
*B62D 33/027* (2006.01)

(52) U.S. Cl.
CPC .................. *B62D 33/0273* (2013.01)

(58) Field of Classification Search
CPC ................................ B62D 33/0273
See application file for complete search history.

(56) References Cited

U.S. PATENT DOCUMENTS

| | | | | | |
|---|---|---|---|---|---|
| 2,405,054 | A | * | 7/1946 | Pringle | B60P 1/4421 296/62 |
| 3,474,921 | A | * | 10/1969 | Rossoni | B60P 1/4414 280/400 |
| 3,498,481 | A | * | 3/1970 | Size | B60P 1/445 414/558 |
| 4,007,844 | A | * | 2/1977 | Perkins | B60P 1/4421 187/243 |
| 4,078,676 | A | * | 3/1978 | Mortenson | B60P 1/445 414/558 |
| 4,344,508 | A | * | 8/1982 | Peck | B60P 1/4414 187/244 |
| 4,806,062 | A | * | 2/1989 | Stier | B60P 1/4421 292/126 |
| 4,813,842 | A | * | 3/1989 | Morton | A01D 90/00 292/DIG. 29 |
| 4,836,736 | A | * | 6/1989 | Neagu | B60P 1/445 414/557 |
| 4,930,973 | A | * | 6/1990 | Robinson | B60P 1/445 414/557 |
| 4,993,908 | A | * | 2/1991 | Park | B60P 1/4421 296/51 |
| 5,171,123 | A | * | 12/1992 | Nuyts | B60P 1/4421 414/540 |
| 5,284,414 | A | * | 2/1994 | Kempf | A61G 3/06 14/71.1 |
| 5,328,225 | A | * | 7/1994 | Melching | B60P 3/42 296/26.11 |
| 5,468,038 | A | * | 11/1995 | Sauri | B62D 33/0273 296/26.1 |

(Continued)

*Primary Examiner* — Lori L Lyjak
(74) *Attorney, Agent, or Firm* — Jason Rogers; Brooks Kushman, P.C.

(57) ABSTRACT

A tailgate cover assembly including a first panel and a second panel fixed to a vehicle tailgate and connected to the first panel by a first hinge assembly, the first panel being pivotable with respect to the second panel. The tailgate cover may also include a third panel fixed to the second panel by a second hinge assembly and being pivotable with respect to the second panel, wherein in an extended state, the first panel and third panel provide a flat surface on the tailgate.

14 Claims, 5 Drawing Sheets

(56) References Cited

U.S. PATENT DOCUMENTS

| | | | | |
|---|---|---|---|---|
| 5,478,130 A * | 12/1995 | Matulin | ............ | B62D 33/0273 296/51 |
| 5,649,731 A * | 7/1997 | Tognetti | ................. | B60P 1/003 296/26.09 |
| 5,826,932 A * | 10/1998 | Desimone | ................ | B60P 3/40 296/26.11 |
| 5,857,724 A * | 1/1999 | Jarman | ............. | B62D 33/0273 296/26.11 |
| 5,918,925 A * | 7/1999 | Perrin | ............... | B62D 33/0273 296/26.11 |
| 5,975,610 A * | 11/1999 | Tracy | ................... | B60N 2/3095 296/57.1 |
| 6,082,801 A * | 7/2000 | Owen | ....................... | B60P 3/40 296/26.08 |
| 6,193,294 B1 * | 2/2001 | Disner | ................ | B62D 33/0273 108/44 |
| 6,206,445 B1 * | 3/2001 | Brooks | ................ | A47J 47/005 296/39.2 |
| 6,340,190 B1 * | 1/2002 | Rosebrugh | ............... | B60P 3/40 296/26.11 |
| 6,378,926 B1 * | 4/2002 | Renze | .................. | B60P 3/40 296/183.1 |
| 6,742,822 B2 * | 6/2004 | Vejnar | ............... | B62D 33/0273 296/26.11 |
| 6,749,250 B1 | 6/2004 | Reid | | |
| 6,779,824 B1 * | 8/2004 | Lazarevich | ............ | B60P 1/003 296/37.6 |
| 6,824,186 B2 * | 11/2004 | Brown | .............. | B62D 33/0273 296/65.01 |
| 6,991,277 B1 * | 1/2006 | Esler | ...................... | B60P 1/435 296/26.08 |
| 7,111,885 B1 * | 9/2006 | Hoffmann | ......... | B62D 33/0273 296/26.11 |
| 7,201,424 B1 * | 4/2007 | Fournier | ........... | B62D 33/0273 296/57.1 |
| 7,354,090 B1 | 4/2008 | Pomorski | | |
| 7,905,532 B2 * | 3/2011 | Johnson | ................... | B60P 3/14 296/26.11 |
| 7,950,728 B2 * | 5/2011 | Plavetich | .................. | B60R 9/00 108/44 |
| 8,029,038 B2 * | 10/2011 | Woodhouse | ......... | B60N 2/3056 108/44 |
| 8,424,946 B2 * | 4/2013 | Newberg | ................. | B60R 5/04 108/44 |
| 8,936,295 B2 * | 1/2015 | Slungare | .................. | B60N 2/14 296/65.12 |
| D743,323 S * | 11/2015 | Lewallen | ..................... | D12/400 |
| 9,387,806 B2 * | 7/2016 | Bzoza | .................... | B60R 5/041 |
| 9,540,051 B2 * | 1/2017 | Bauer | ..................... | B62D 33/03 |
| 2002/0000732 A1 * | 1/2002 | Sanders | ................. | B60P 3/40 296/26.08 |
| 2008/0203752 A1 | 8/2008 | Warkentin | | |

* cited by examiner

_US 9,862,430 B1_

TAILGATE COVER

TECHNICAL FIELD

The technical field of this disclosure relates to tailgate covers.

BACKGROUND

Pickup trucks include tailgate doors that are movable between open and closed positions. When tailgate doors are open, owners may wish to set items, or otherwise use the tailgate door, as a table or countertop. Due to the manufacturing constraints and strength and stiffness requirements, the interior sides of tailgate doors often include an uneven surface, preventing the use of the interior side for tailgating, worksites, etc.

SUMMARY

A tailgate cover assembly may include a first panel and a second panel fixed to a vehicle tailgate and connected to the first panel via a first hinge assembly, the first panel configured to be movable with respect to the second panel. The tailgate cover may also include a third panel fixed to the second panel via a second hinge assembly and configured to be movable with respect to the second panel, wherein in an extended state, the first panel and third panel provide a flat surface on the tailgate.

A tailgate assembly may include a tailgate having a cover including a fixed panel attached to an inner panel of the tailgate and at least two outer panels arranged on either side of the fixed panel, the outer panels hinged to the fixed panel via hinge assemblies and moveable between collapsed and extended states.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A foldable and expandable tailgate cover is disclosed that is configured to provide a flat, smooth surface on an interior surface of a tailgate. When the tailgate is extended, the cover may provide a surface for tailgating, laying out blueprints and other documents, resting containers, especially those including food and liquids, etc. This aftermarket cover does not require drilling into the tailgate assembly, and eliminates the potential for corrosion down the road. Using the bi-fold and tri-fold designs, the tailgate cover may provide for a flexible and foldable surface that is easily stored and attached to the inner surface of the tailgate assembly.

Figure 1:
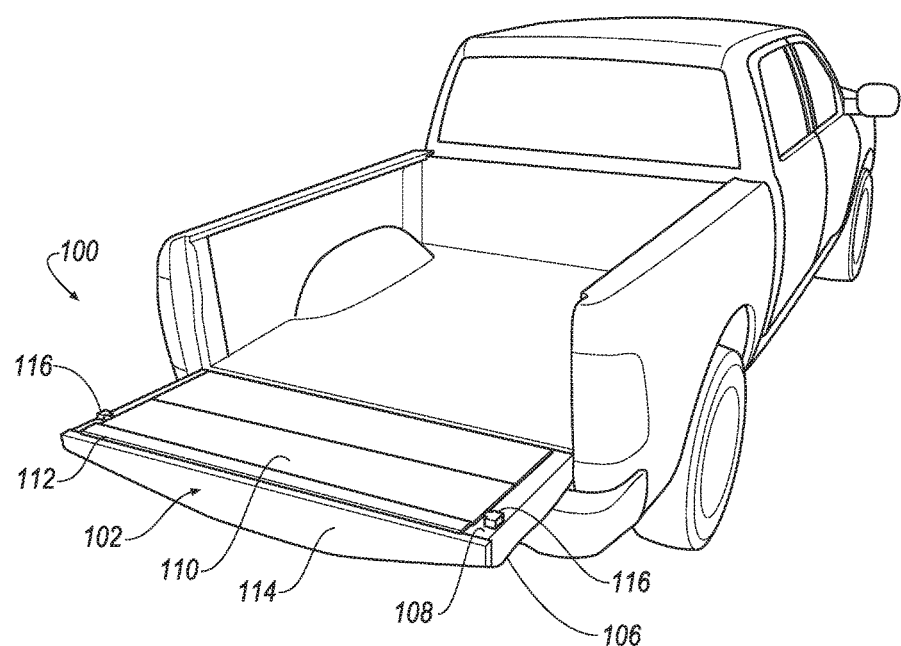
FIG. 1 illustrates an example tailgate assembly with tailgate cover.

FIG. 1 illustrates an example tailgate assembly 100. The tailgate assembly 100 may include a tailgate door 102 including a tailgate body panel 106 and an inner panel 108 of the tailgate assembly 100. The inner panel 108 provides rigidity to the tailgate assembly 100 and may include various recesses, protrusions, and overall provide an uneven surface. When the tailgate assembly 100 is in an open state, as shown in FIG. 1, owners, user, drivers, etc., may desire to set items on top of the inner panel 108 of the tailgate assembly 100. A tailgate cover 110 may be arranged on the inner panel 108 to provide a smooth, flat surface.

The tailgate cover 110 may include at least one panel configured to cover at least a portion of the inner panel 108. The cover 110 may include a lip 112 configured to extend over a top portion 114 of the tailgate assembly 100. The cover 110 may be attached to the inner panel 108 via an attachment mechanism (not shown). The cover 110 may include a latch mechanism 116 to maintain the cover 110 in a collapsed state.

The tailgate cover 110 may be made from various materials. In one example, the panels of the cover may be made from sheet metal such as aluminum. In another example, the panels may be made of plastic, including hard plastics and polypropylene. Other materials, or combination of materials, may be used as well. Several different embodiments of the cover 110 are discussed in more detail with reference to the figures.

Figure 2A:
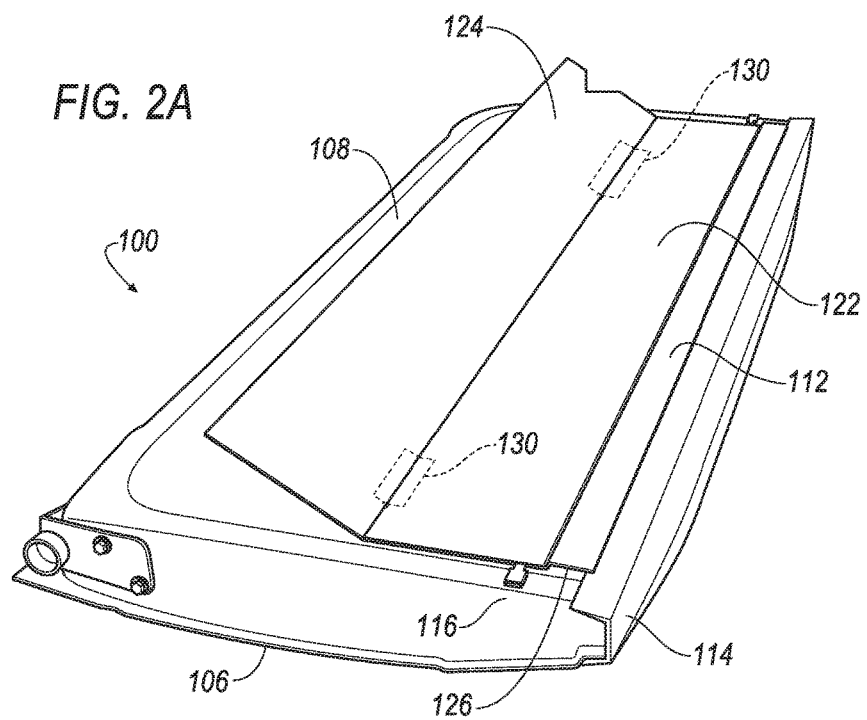
FIG. 2A illustrates an example tailgate cover having two panels in a partially extended state.

FIG. 2A illustrates an example tailgate cover 110 having two panels in a partially extended state. The tailgate cover 110 may include a first panel 122 and a second panel 124. The first panel 122 may be fixed to the inner panel 108 of the tailgate assembly 100 via the attachment mechanism. The second panel 124 may be connected to the first panel 122 by a hinge assembly 130 and may movable with respect to the first panel 122. The hinge assembly 130 may include at least one hinge 130 configured to permit movement between the two panels 122, 124. In the example shown in FIG. 2A, the hinge assembly 130 may include two hinges and may be arranged at a proximal end 126 of the cover 110. In another example, such as that shown in FIG. 3A, the hinge assembly 130 may include a piano hinge.

In an extended state, the two panels 122, 124 may extend across a portion of the inner panel 108 of the tailgate assembly, providing a smooth, flat surface.

Figure 2B:
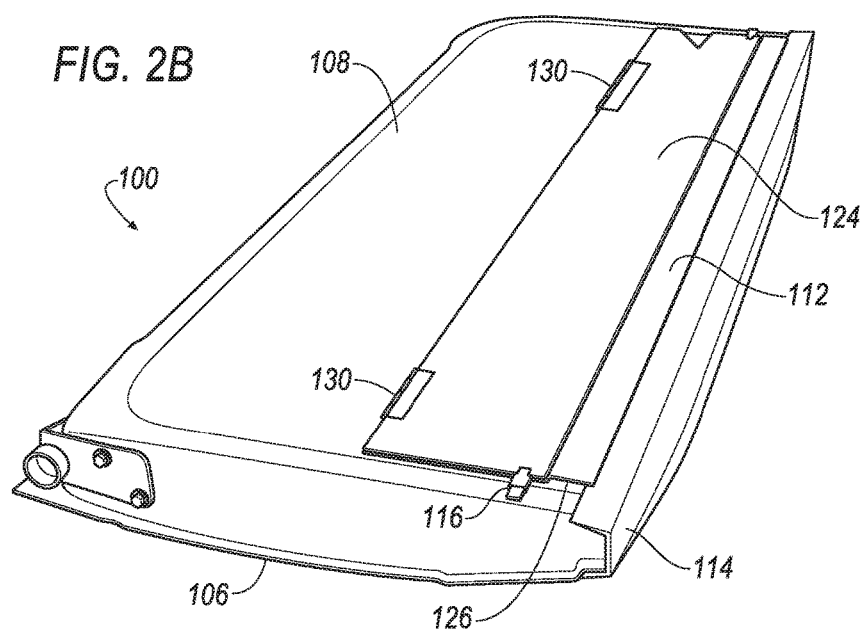
FIG. 2B illustrates the tailgate cover of FIG. 2A in a collapsed state.

FIG. 2B illustrates the tailgate cover 110 of FIG. 2A in a collapsed state. In the collapsed state, the second panel 124 may be folded at the hinge assembly 130 and configured to rest on top of the first panel 122. In this configuration, only a portion of the inner panel 108 is covered by the cover 110. During vehicle use, when the vehicle is being driven, the second panel 124 may be secured to the tailgate assembly by the latch mechanism 116.

The latch mechanism 116 may include a hook and eye mechanism configured to maintain the second panel 124 on top of the first panel 122. The eye may be arranged on the inner panel 108 and a hook may be arranged on the second panel 124. When the second panel 124 is in a collapsed stated, the hook and align with the eye and the two parts may engage to lock the second panel 124 to the first panel 122.

In other configurations, the latch mechanism 116 may include other types of latches such as a cam lock, or other spring loaded latches such as a detent latch, bolt latch, etc. Other example latch mechanisms may include a draw latch, rotary latch, compression latch, crossbars, Suffolk latch, Norfolk latch, etc. In the examples shown a latch mechanism 116 may include a pair of latch mechanisms arranged on each side of the first panel 122. More or less mechanisms may be implemented.

The first panel 122 and second panel 124 may be magnetized to create a magnetic field between each other and be configured to be magnetically attached to each other in the collapsed state. In this example, the surface of the first panel 122 may have an opposite polarity as that of the surface of the second panel 124.

Figure 3A:
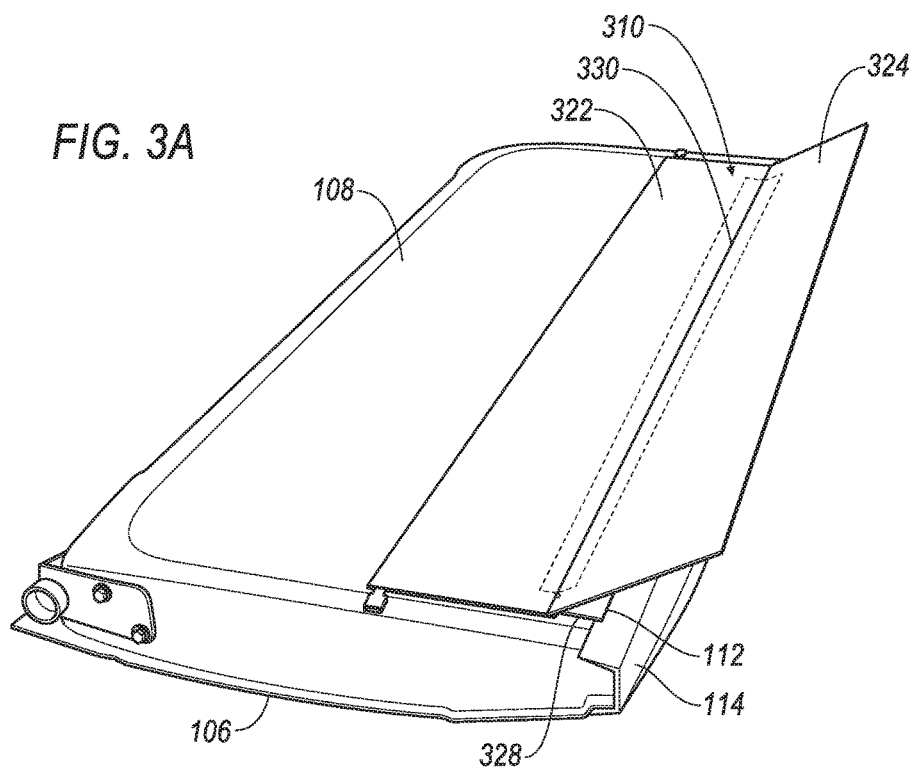
FIG. 3A illustrates an example tailgate cover having two panels in a partially extended state.

FIG. 3A illustrates an example tailgate cover 310 having two panels in a partially extended state. The tailgate cover 310 may include a first panel 322 and a second panel 324. The first panel 322 may be fixed to the inner panel 108 of the tailgate assembly by the attachment mechanism. The second panel 324 may be connected to the first panel 322 by a hinge assembly 330 and may be moveable with respect to the first panel 322. In this example, the hinge assembly 330 may include a single piano hinge. In contrast to the examples shown in FIGS. 2A and 2B, the hinge assembly 330 may be arranged at a distal end 328 of the cover 110.

In the extended state, the second panel 324 may extend over the top portion 114 of the tailgate assembly 100. In this example, the second panel 324 may form an extension of the cover 110 beyond the inner panel 108. The hinge assembly 330 and/or the lip 112 may maintain the second panel 324 in a horizontal position, creating a uniform, flat surface with the first panel 322.

Figure 3B:
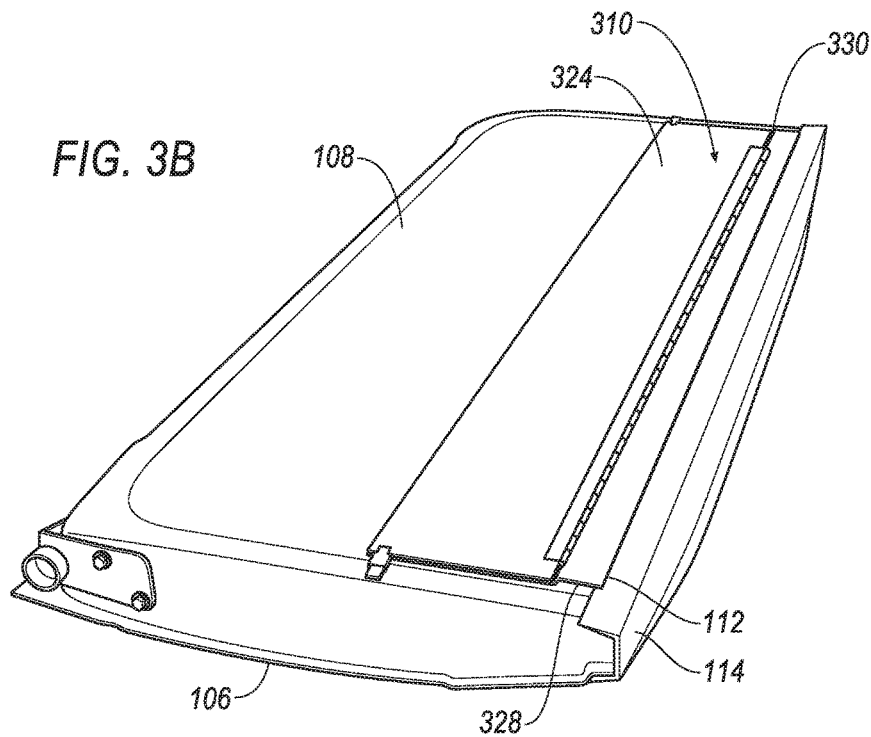
FIG. 3B illustrates the tailgate cover of FIG. 3A in a collapsed state.

FIG. 3B illustrates the tailgate cover 310 of FIG. 3A in a collapsed state. In the collapsed state, the second panel 324 may be folded at the hinge assembly 330 and configured to rest on top of the first panel 322. In this configuration, only a portion of the inner panel 108 is covered by the cover 310. During vehicle use, when the vehicle is being driven, the second panel 324 may be secured to the tailgate assembly via the latch mechanism 116.

Figure 4A:
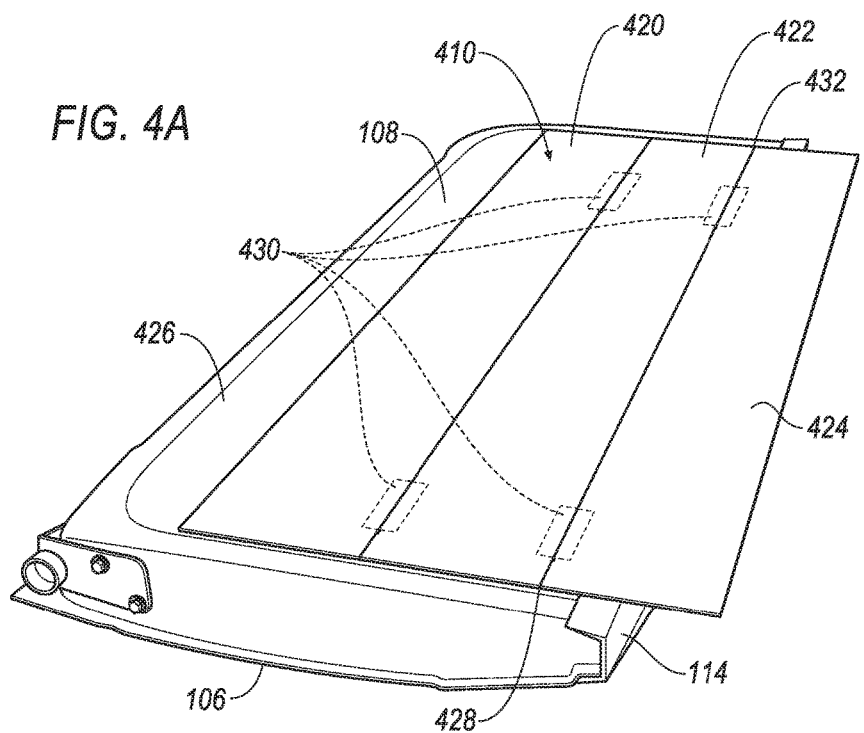
FIG. 4A illustrates the tailgate cover having three panels in an extended state.

FIG. 4A illustrates the tailgate cover 410 having three panels in an extended state. The tailgate cover 410 may include a first panel 420 connected to a second panel 422 via a first hinge assembly 430. The tailgate cover 410 may also include a third panel 424 connected to the second panel 422 via a second hinge assembly 432. The second panel 422 (also referred to herein as fixed panel 422) may be fixed to the inner panel 108 of the tailgate assembly 100 via the attachment mechanism. The first panel 420 may be movable with respect to the second panel 422 at the first hinge assembly 430. The third panel 424 may be movable with respect to the second panel 422 at the second hinge assembly 432. In the extended state, the third panel 424 may be configured to extend outward over the top portion 114 of the tailgate assembly 100 at the distal end 428, thus extending the flat surface beyond the inner panel 108. The first panel 420 may extend at the proximal end 426 of the inner panel 108 to cover at least a portion of the inner panel 108. The first panel 420 and third panel 424 may collectively be referred to as the outer panels 420, 424, each being moveable about the fixed panel 422.

Figure 4B:
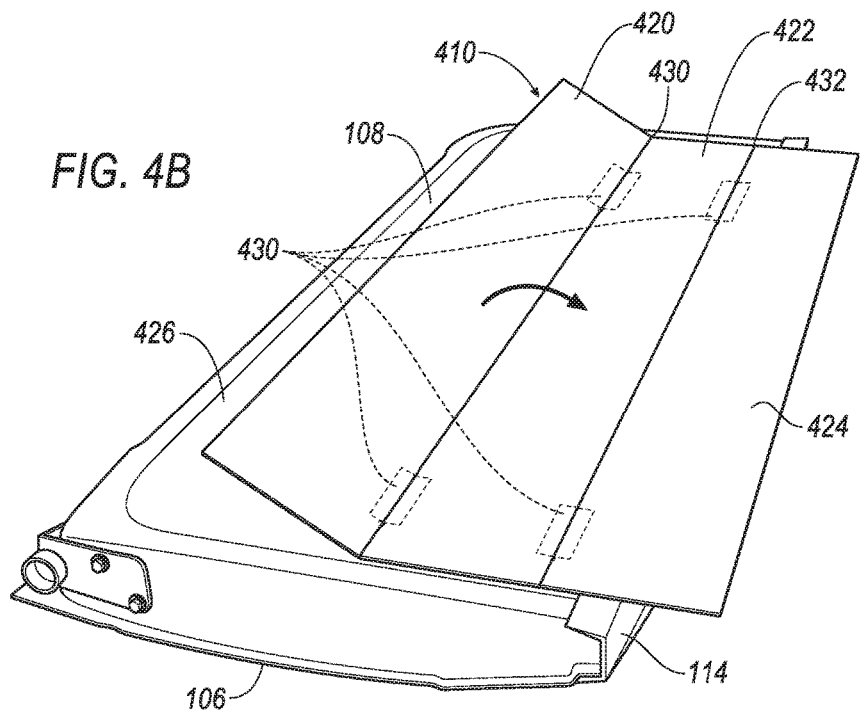
FIG. 4B illustrates the tailgate cover of FIG. 4A where the first panel is in a partially collapsed state.

FIG. 4B illustrates the tailgate cover 410 of FIG. 4A where the first panel 420 is in a partially collapsed state. In this example, the first panel 420 may be folded at the first hinge assembly 430. In this example, the third panel 424 may remain in an extended state.

Figure 4C:
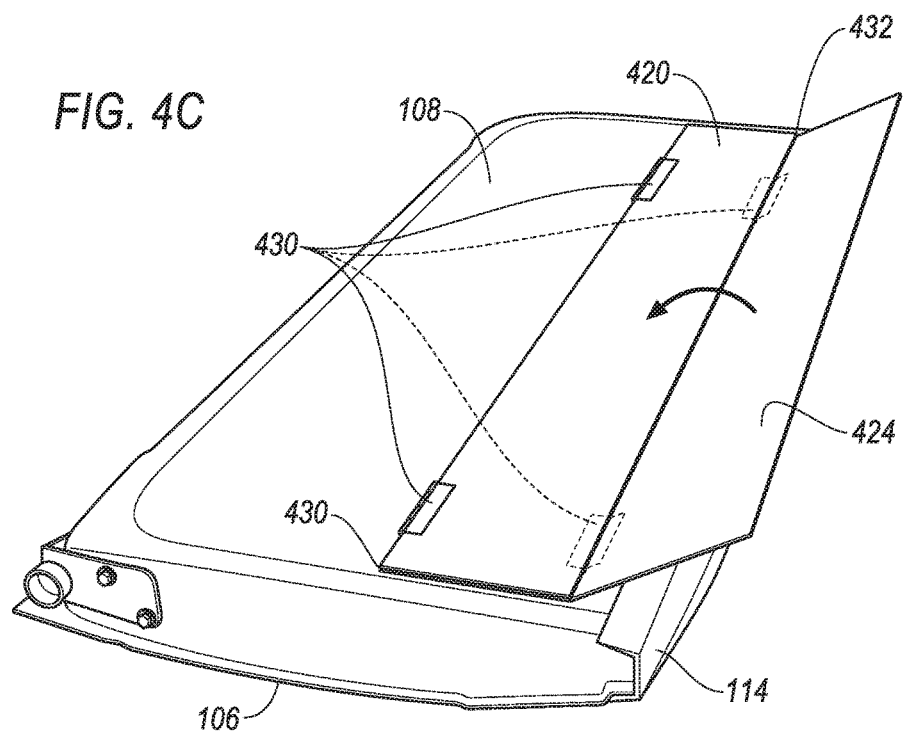
FIG. 4C illustrates the tailgate cover of FIG. 4B where the first panel is in a collapsed state and the third panel is in a partially collapsed state.

FIG. 4C illustrates the tailgate cover 410 of FIG. 4B where the first panel 420 is in a collapsed state and the third panel 424 is in a partially collapsed state. The first panel 420 may be folded at the second hinge assembly 434. In the examples shown in FIGS. 4B and 4C, the first panel 420 may first be folded to rest on top of the second panel 422, followed by the third panel 424 being folded to rest on top of the first panel 420. However, the panels may be folded with the third panel 424 being folded over the second panel 422 followed by the first panel 420.

Figure 4D:
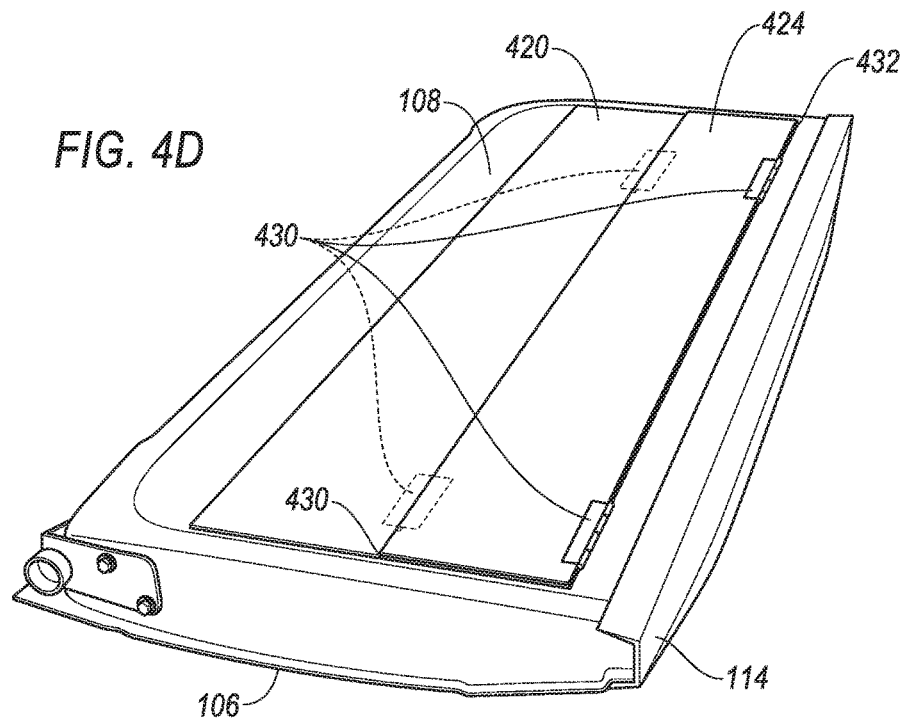
FIG. 4D illustrates the tailgate cover of FIG. 4A where the first panel is in an extended state and the third panel is in a collapsed state.

FIG. 4D illustrates the tailgate cover of FIG. 4A where the first panel 420 is in an extended state and the third panel 424 is in a collapsed state. In this example, the third panel 424 may be folded at the second hinge assembly 432 and may be resting on top of the second panel 420.

Thus, the examples shown in FIGS. 4A-D may provide for a flexible tri-fold cover 410 that may have both outer panels 420, 424 extended to provide a larger flat surface. The tri-fold cover 410 may be configured so that only one of the outer panels 420, 424 is extended, with the other of the outer panels 420, 424 being in a folded state on top of the fixed panel 422.

Accordingly, a tailgate cover is described herein that is configured to provide a flat, smooth surface on the interior surface of a tailgate. When the tailgate is extended, the cover may provide a surface for tailgating, laying out blueprints and other documents, resting containers, especially those including food and liquids, etc. This aftermarket cover may not require the need to drill into the tailgate assembly, thus eliminating the potential for corrosion down the road.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tailgate cover assembly, comprising:
   a first panel;
   a second panel fixed to a vehicle tailgate and connected to the first panel by a first hinge assembly, the first panel being pivotable with respect to the second panel; and
   a third panel fixed to the second panel by a second hinge assembly and being pivotable with respect to the second panel, wherein in an extended state, the first, second and third panels provide a flat surface on the tailgate.

2. The assembly of claim 1, wherein the third panel is arranged at a distal end of the tailgate and is configured to extend beyond the tailgate in the extended state.

3. The assembly of claim 1, wherein the first panel is arranged on the tailgate and is configured to extend to a proximal end of the tailgate in the extended state.

4. The assembly of claim 1, further comprising at least one latch mechanism configured to maintain at least one of the first panel and the third panel on top of the second panel.

5. The assembly of claim 4, wherein the latch mechanism includes a hook and eye mechanism.

6. The assembly of claim 1, wherein the first hinge assembly includes a piano hinge.

7. The assembly of claim 1, wherein the second hinge assembly includes a piano hinge.

8. A tailgate assembly, comprising:
 a tailgate having a cover including a fixed panel attached to an inner panel of the tailgate and at least two outer panels arranged on either side of the fixed panel, the outer panels being connected by first and second hinges to the fixed panel and being moveable between a collapsed state and an extended state.

9. The assembly of claim 8, wherein one of the outer panels is arranged at a distal end of the tailgate and is configured to extend beyond the tailgate in an extended state.

10. The assembly of claim 9, wherein the other of the outer panels is configured to extend to a proximal end of the tailgate in the extended state.

11. The assembly of claim 8, further comprising at least one latch mechanism configured to maintain at least one of the outer panels on top of the fixed panel.

12. The assembly of claim 11, wherein the latch mechanism includes a hook and eye mechanism.

13. The assembly of claim 8, wherein the hinge assemblies includes a piano hinge.

14. The assembly of claim 8, wherein the hinge assemblies includes a piano hinge.

* * * * *